Sept. 11, 1923.
F. S. CONKLIN
TRAP
Filed March 8, 1921    3 Sheets-Sheet 1
1,467,921
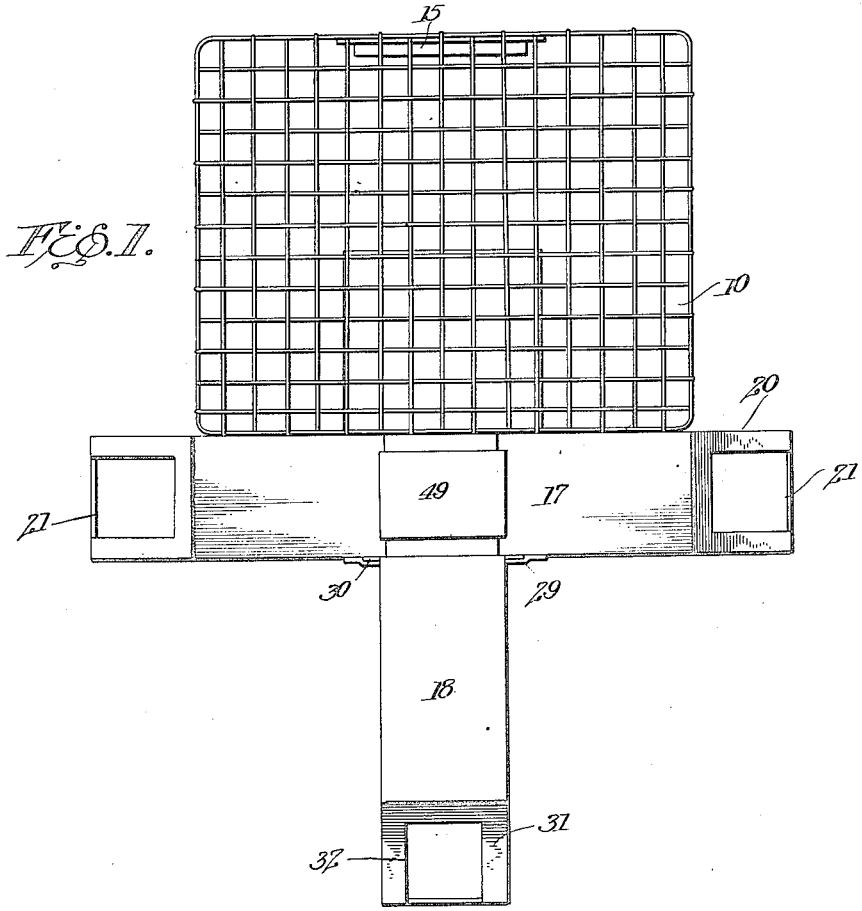
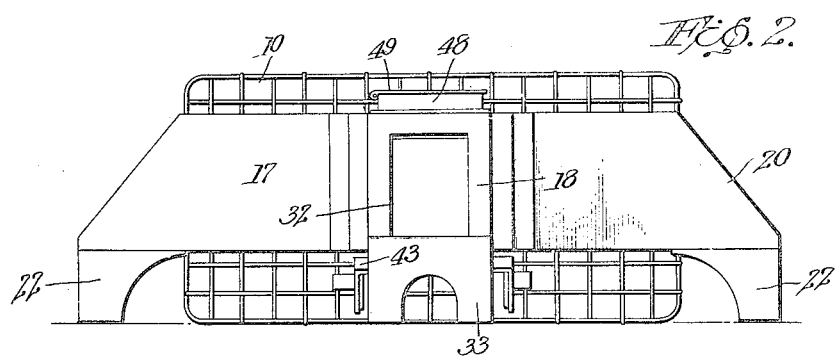
Frederick S. Conklin,
INVENTOR Sept. 11, 1923.

F. S. CONKLIN

TRAP

Filed March 8, 1921

Frederick S. Conklin,
INVENTOR

BY Victor J. Evans
ATTORNEY

WITNESS:

Sept. 11, 1923.                F. S. CONKLIN                1,467,921
                                   TRAP
                       Filed March 8, 1921        3 Sheets-Sheet 3

Frederick S. Conklin,
INVENTOR
BY Victor J. Evans
ATTORNEY

WITNESS:

Patented Sept. 11, 1923.

1,467,921

UNITED STATES PATENT OFFICE.

FREDERICK S. CONKLIN, OF YONKERS, NEW YORK.

TRAP.

Application filed March 8, 1921. Serial No. 450,720.

*To all whom it may concern:*

Be it known that I, FREDERICK S. CONKLIN, a citizen of the United States, residing at Yonkers, in the county of Westchester and State of New York, have invented new and useful Improvements in Traps, of which the following is a specification.

This invention relates to trapping devices, particularly to those of the cage type, and has for its object the provision of a novel trap device designed primarily for trapping small animals of all kinds.

An important object is the provision of a trap of this character including a cage member and entrance member, the latter having a plurality of similar openings which prevent entry of the animal to be trapped and the entrance member being formed with a plurality of cooperating treadles which operate to close doors at the entrance openings when the weight of an animal passes the innermost ends of the treadle members.

Another object is the provision of a trap of this character in which the entrance member is separated from the cage member by a transparent door in line with which is arranged a mirror so that an animal entrapped within the entrance member may see his reflection in the mirror and be lead to believe that there are other animals of his kind in the trap, it being designed that this reflection be instrumental in increasing the efficiency of the trap.

An additional object is the provision of a trap of this character which will be simple and inexpensive in construction, which will be entirely automatic in its action and requiring no resetting, which will be highly efficient and durable in use and a general improvement in the art.

Figure 5:
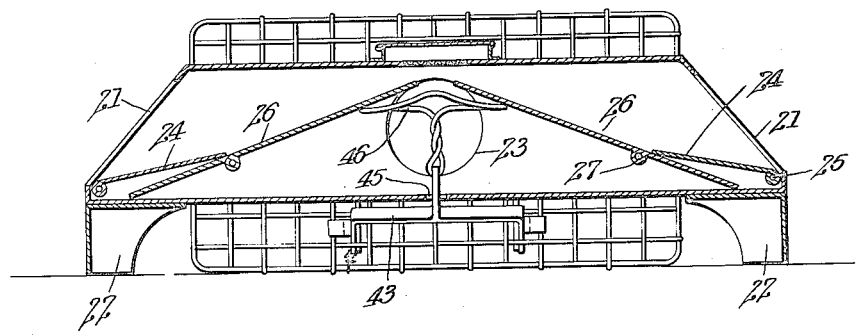
Figure 6:
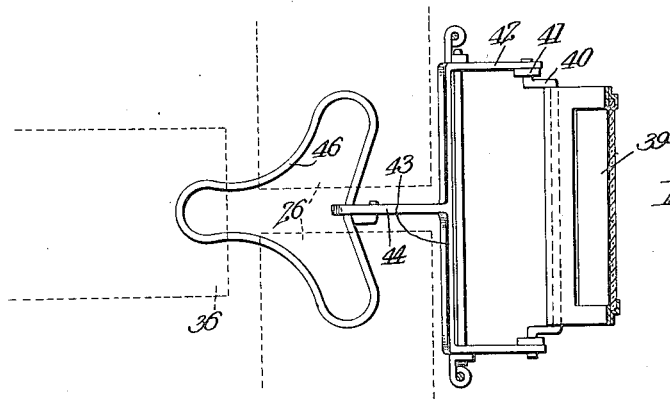

With the above and other objects and advantages in view, the invention consists in the details of construction to be hereinafter more fully described and claimed, and illustrated in the accompanying drawings, in which:

Figure 1 is a plan view of my trap.
Figure 2 is a front elevation thereof.
Figure 3 is a side elevation.
Figure 4 is a central cross sectional view.
Figure 5 is a longitudinal sectional view taken through the entrance member and
The remaining figure is a detailed view.

Referring more particularly to the drawings I have shown my trap as comprising a cage member 10 which is formed in its front wall with an opening 11 at which is secured a passage member 12 having an upwardly and rearwardly inclined back wall 13 which is open. At one side the cage 10 is provided with a suitable exit opening normally closed by a hinged door 14 provided with suitable catch means. Secured within the cage 10 at a point directly opposite the passage member 12 is a mirror 15 for a purpose to be described.

Located at the front of the cage is an entrance member of substantially T-shape including sections 17 and 18. The section 17 is shown as being slightly longer than the cage though it is understood that such a limitation is not necessary. This section 17 is secured to the cage by any desired means such as indicated at 19. The section 17 is formed as an elongated hollow body preferably rectangular in cross section and having inclined ends 20 formed with openings 21 permitting the passage of animals. It will be observed that the end portions of the section 17 are provided with supporting feet 22 whereby the bottom of the section 17 will be spaced above the ground or other surface upon which the trap is set. The back wall of the section 17 is provided at a point opposite the passage member 12 with a hole 23 adapted to establish communication with the cage.

Located within the end portions of the section 17 are doors 24 which are pivoted as shown at 25 and which are normally open but adapted to be moved upwardly to close the entrance openings 21. Also disposed between the ends of the section 17 are treadle members 26 which are pivoted as shown at 27 with their inner ends nearly touching and with their outer ends disposed beneath the door members 24 for operating the latter at certain times as will be hereinafter explained.

The front wall of the section 17 is formed with an opening 28 at the sides of which are disposed guide flanges 29 with which are engaged 30 formed on one end of the section 18. This section 18 is similar in construction to the section 17 but is shorter and has exactly the same type of inclined outer end 31 provided with an opening 32 permitting entrance of an animal. The outer end of this section 18 is likewise provided with supporting feet 33 corresponding to the feet 22. The opening 32 is adapted to be closed by means of a door 34 pivoted as shown at 35 and engageable by one end of a treadle member 36 pivoted at 37 within the section 18. This treadle member 36 has its inner end disposed adjacent the inner ends of the treadle members 26 as clearly shown so as to cooperate therewith as will be described.

Pivoted as shown at 38 at the lower end of the passage member 12 within the cage is a door 39 formed of glass so that an animal may see through it and see his reflection in the mirror 16. This door 39 carries 40 to which are pivotally connected links 41 which are in turn pivotally connected with the arms 42 of a U-shaped yoke 43 which has its bight portion carrying a lever 44 operating through a slot 45 in the bottom of the center of the section 17 of the entrance member. Carried by the free end of the lever 44 is a frame 46 which engages beneath the inner ends of all of the treadle members 26 and 36. Connected with one arm 42 of the yoke 43 is a coil spring 47 which has its other end connected with some convenient part of the cage. The purpose of this spring is to hold the glass door normally closed and to urge the lever 44 upwardly so as to hold the inner end of all of the treadle members elevated so that the doors 24 and 34 will remain open.

Secured centrally of the top of the section 17 of the entrance member is a suitable receptacle 48 designed for holding whatever bait it is designed to use in the trap and access is gained to this receptacle 48 through a door 49 in the top of the section 17.

The operation of the trap is as follows:—
Assuming that the parts of the device are constructed and assembled as above described, the operation is as follows; the animals to be trapped are of course attracted by the odor of the bait within the receptacle 48 and will upon approaching device search for an opening whereby they may gain access to the bait. It will be observed that the animal may enter either of the sections 17 or 18 through the openings 32 or 21 respectively. An animal entering through any one of these openings must walk upon the inclined treadle member 26 or 36 as the case may be, and as the animal approaches the center of the entrance member his weight will cause the treadle member to be depressed. Downward movement of the inner end of any one of the treadle members will cause all of the doors 24 and 34 to swing upwardly and close the entrance openings. It is then impossible for the animal to retrace his steps and escape from the entrance member. At the same time the inner end of any one of the treadle members is depressed, the frame 46 will cause the lever 44 to be moved downwardly and this will result in locking of the U-shaped yoke 43 in opposition to resistance of the spring 47 whereupon the glass door 39 will be swung open. The animal will of course see his reflection in the mirror and will be led thereby to believe that there are other animals of his kind in the trap and this fact will operate to give him confidence and induce him to pass through the openings at the center of the back wall of the section 17 and pass into the passage member 12 and over the downwardly swung door 39 into the cage 10. The instant that the animal passes into the cage the spring 47 will operate to swing the glass door 39 upwardly to its closed position and will also operate to press all of the treadle members into such position that their inner ends will be elevated as in the first place. This will of course allow the doors 24 and 34 to drop down to their normal positions leaving the entrances open so that the trap will be ready for the next animal without any necessity whatever for resetting by hand.

From the foregoing description and a study of the drawings it will be apparent that I have thus provided a very simply constructed and consequently comparatively inexpensive trap for use in catching small animals of various kinds, the trap being entirely automatic in operation and requiring absolutely no manual setting after trapping of an animal. Owing to the simplicity of the construction it is likewise to be observed that there is practically nothing to get out of order and that the durability and length of life of the device should be almost unlimited.

While I have shown and described the preferred embodiment of the invention, it is of course to be readily understood that I reserve the right to make such changes in the form, construction and arrangement of parts as will not depart from the spirit of the invention or the scope of the subjoined claim.

Having thus described my invention, I claim:—

A trap including a plurality of pivoted treadle members having adjacent ends, a U-shaped frame pivotally supported below the said adjacent ends of the treadle members, a frame carried by said U-shaped frame and providing a support for the adjacent ends of the treadle members, a spring normally holding the U-shaped frame tilted with the said supporting frame holding the adjacent ends of the treadle members at an elevation, a trap having a closure operatively connected with the said U-shaped frame and normally held closely thereby when the supporting frame is elevated, and an entrance for the said trap embodying a plurality of passage ways enclosing the said treadle members and presenting doors overlying the said treadle members, said doors being moved to closed position by the descent of the said treadle member.

In testimony whereof I affix my signature.

FREDERICK S. CONKLIN.